United States Patent

Thomas et al.

[11] Patent Number: 5,975,797
[45] Date of Patent: Nov. 2, 1999

[54] SUBTERRANEAN WATER COLLECTION AND DELIVERY DEVICE AND SYSTEM

[75] Inventors: Jeffrey K. Thomas, Commerce Township; Frank J. Walker, Birmingham, both of Mich.

[73] Assignee: Morgan Concepts, Inc., Farmington Hills, Mich.

[*] Notice: This patent is subject to a terminal disclaimer.

[21] Appl. No.: 08/902,530

[22] Filed: Jul. 29, 1997

Related U.S. Application Data

[63] Continuation-in-part of application No. 08/687,634, Jul. 26, 1996, Pat. No. 5,795,100.

[51] Int. Cl.⁶ ............... E02B 13/00; A01G 29/00
[52] U.S. Cl. .................. 405/45; 47/48.5; 405/36; 405/50
[58] Field of Search .................. 405/45, 36, 50, 405/43; 47/48.5

[56] References Cited

U.S. PATENT DOCUMENTS

| | | |
|---|---|---|
| 419,242 | 1/1890 | Brown . |
| 1,490,865 | 4/1924 | Van De Velde ............ 47/48.5 |
| 1,791,873 | 2/1931 | Neiman . |
| 1,923,677 | 8/1933 | Lovett, Jr. . |
| 1,971,390 | 8/1934 | Yahres . |
| 2,105,800 | 1/1938 | Watkins ............ 47/48.5 X |
| 2,145,934 | 2/1939 | Kingman ............ 405/50 X |
| 2,380,721 | 7/1945 | Brigden . |
| 2,755,985 | 7/1956 | Finegan ............ 47/48.5 X |
| 3,319,379 | 5/1967 | Groeber et al. . |
| 3,755,966 | 9/1973 | Smith . |
| 3,821,863 | 7/1974 | Chan . |
| 4,056,898 | 11/1977 | Brucato et al. . |
| 4,061,272 | 12/1977 | Winston ............ 405/45 |
| 4,454,684 | 6/1984 | O'Hare ............ 47/48.5 X |
| 4,726,143 | 2/1988 | Steinbeck . |
| 4,753,394 | 6/1988 | Goodman ............ 47/48.5 X |
| 4,785,575 | 11/1988 | Shioi . |
| 5,172,515 | 12/1992 | Lapshansky et al. ............ 47/48.5 |
| 5,347,753 | 9/1994 | Dall . |
| 5,533,300 | 7/1996 | Kesler . |

FOREIGN PATENT DOCUMENTS

| | | |
|---|---|---|
| 622630 | 6/1961 | Canada . |
| 0193167 | 9/1986 | European Pat. Off. ............ 47/48.5 |
| 2 249 463 | 5/1992 | United Kingdom . |

*Primary Examiner*—Dennis L. Taylor
*Attorney, Agent, or Firm*—Harness, Dickey & Pierce, P.L.C.

[57] ABSTRACT

In accordance with the teachings of the present invention, a subterranean water and air collection and delivery device for facilitating the collection and delivery of air, natural ground water, manually supplied water, and/or pressurized water from an irrigation system to the roots of plants is provided. The device includes a plastic enclosure member including a plurality of apertures and having an interior volume within which water and air is collected and redirected. A porous insert member is located within the interior volume of the plastic enclosure member and substantially occupies the entire volume for facilitating collection and delivery of water and air while substantially preventing surrounding ground material from entering the interior volume of the enclosure member. The enclosure member is buried at a predetermined depth near the roots of the at least one plant such that the apertures throughout the device provide ingress and egress for water and air to and from within the interior volume at various depths for the efficient delivery of the water and air to the roots of the at least one plant and for reducing the potential for non-point source pollution.

22 Claims, 7 Drawing Sheets

12 # SUBTERRANEAN WATER COLLECTION AND DELIVERY DEVICE AND SYSTEM

CROSS REFERENCE TO RELATED APPLICATION

This application is a continuation-in-part of related application Ser. No.: 08/687,634, filed on Jul. 26, 1996 now U.S. Pat. No. 5,795,100.

BACKGROUND OF THE INVENTION

1. Technical Field

This invention relates to plant irrigation, oxygenation and feeding devices and feeding systems and, more particularly, to a subterranean water collection and delivery device and system for irrigating, oxygenating and feeding plants.

2. Discussion of the Related Art

Regardless of whether a tree, bush, or shrub, i.e. plants in general, are planted properly or improperly, a potentially serious problem exists of how such plants receive water and oxygen from above ground level down to their roots where it is needed. Likewise, naturally flowing surface and subsurface ground water often is inhibited from traveling down to various depths where plants' roots have migrated because of varying soil conditions. Immediately after planting, there is less of a problem because the soil surrounding the newly planted plants is loose allowing surface and subsurface ground water and air to freely reach the plants' roots. However, after approximately two weeks, this soil will begin to become compacted and the surface and subsurface ground water and air may be inhibited from traveling freely through the soil to the roots as needed. In the situation where a single plant has been planted, the planter can leave a water hose running for days or weeks in the proximity of the plant and eventually some of the water will reach the roots, but if more than one plant is involved, the watering schedule becomes more critical. For example, a manually placed above ground sprinkler may be left running with a low flow rate for days or weeks. The same is true with commonly employed automatic underground sprinkler systems that water a given area periodically for a predetermined amount of time. However, such water schedules often provide only a fraction of the water necessary for the survival and on going growth of many types of plants. Additionally, in many planting areas where irrigation is not available and the soil conditions do not freely permit the penetration of water to depths commonly associated with the roots of many types of plants, such plants may refuse to grow, may be stunted or wilted, or may die from a lack of needed water and/or nutrients.

Unfortunately, regular surface watering often does not freely penetrate through the ground down to the roots of many plants, and the majority of the water runs past such plants due to soil strata densities. Also, the use of a slow running water hose is a wasteful and risky method of watering plants because running many gallons, sometimes hundreds of gallons, of water in a small area over days will often cause the water to travel in the proximity just below the ground surface on dense soil strata and migrate far away from the plants' deeper roots where it is needed. Surface watering may also enhance the possibility of non-point source pollution which occurs when pollutants are carried away from the plant by water and are deposited into rivers, lakes, coastal waters or ground water.

It is therefore desirable to provide a subterranean water collection and delivery device for efficiently routing natural surface water, naturally flowing subterranean water and nutrients and oxygen to a plant's roots which may extend a distance below ground level where the ground water and air does not freely migrate.

More particularly, it is desirable to provide a subterranean water and air collection and delivery device which is simply buried at a predetermined depth below ground level and in close proximity to the roots of a plant, typically near the drip line, for providing ingress and egress for surrounding ground water and air at various depths where the plant's roots are located.

It is further desirable to provide a subterranean plant root water and air collection and delivery device that delivers water, air and external substances from above ground level and collects and redirects naturally flowing subterranean water and air to a plant's roots and is easily integrated into an underground irrigation system.

SUMMARY OF THE INVENTION

In accordance with the teachings of the present invention, a subterranean plant root water and air collection and delivery device for facilitating the delivery of water, air and nutrients to the roots of a plant at various levels below ground is disclosed.

In accordance with the teachings of one embodiment of the present invention, the subterranean plant root water and air collection and delivery device includes an enclosure member including a plurality of apertures with an interior volume within which surrounding subterranean ground water and air is collected and naturally redispersed. A porous insert member is located within the interior volume of the enclosure member and substantially occupies the entire interior volume for facilitating collection and delivery of the ground water and air through to the apertures to the root areas of at least one plant. The insert member also substantially prevents surrounding ground material from entering the interior volume of the enclosure member. The enclosure member is buried at a predetermined depth in close proximity to the roots and the drip line of at least one plant such that the plurality of apertures provide ingress and egress for the surrounding ground water and air to and from within the interior volume for efficiently delivering the water and air to the roots of at least one plant.

In accordance with a preferred embodiment, the enclosure member is formed from plastic and includes at least one nipple member extending outwardly from its side surface for engaging a pressurized water and nutrient delivery member which delivers pressurized water and nutrients to its interior volume and ultimately to the roots of the plant.

In accordance with another preferred embodiment, the device includes a funnel member having an upper and a lower portion insertable within an aperture in a top surface of the plastic enclosure member. The funnel member includes a height adjusting mechanism for extending the upper portion of the funnel member at different heights from the top surface of the plastic enclosure member and above ground level for funneling external substances to the interior volume of the enclosure member and ultimately to the roots of the plant.

In accordance with an alternate preferred embodiment, the device is formed of an annular (e.g., cylindrical, hexagonal or square) plastic body having apertures substantially about its entire surface. A top cap, and a bottom cap or a through connector, are fastened to the first end and second end of the body after a porous insert is positioned within the interior volume thereover. Nipple members may be fastened to the body of the present embodiment to provide for attachment to an irrigation system.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENTS

The following description of the preferred embodiments is merely exemplary in nature and is in no way intended to limit the invention or its application or uses.

The present invention is particularly concerned with providing a subterranean plant root water and air collection and delivery device that efficiently collects and redirects air, naturally flowing surface water, subterranean water, manually supplied water, and/or water and nutrients supplied by an irrigation system to the roots of trees, bushes, or shrubs, all commonly referred to as plants, for improving the growth and health of such plants. It is important that most types of plants receive an appropriate amount of water, air and nutrients such as fertilizer and phosphates, especially during the first several years after planting, for facilitating the maturity of their root structures. The present invention is specifically designed for integration into an underground irrigation system and/or may be used as a complete stand-alone system where underground irrigation is not available. Additionally, the present invention is particularly concerned with providing a device which provides for manual above-ground application of air, water and/or fertilizers and efficiently delivers these substances to the root structures of all types of plants. The present invention provides flexibility for many applications in that it may be installed at the time of new planting or may be used in conjunction with an existing plant.

Figures 1, 2, 3:
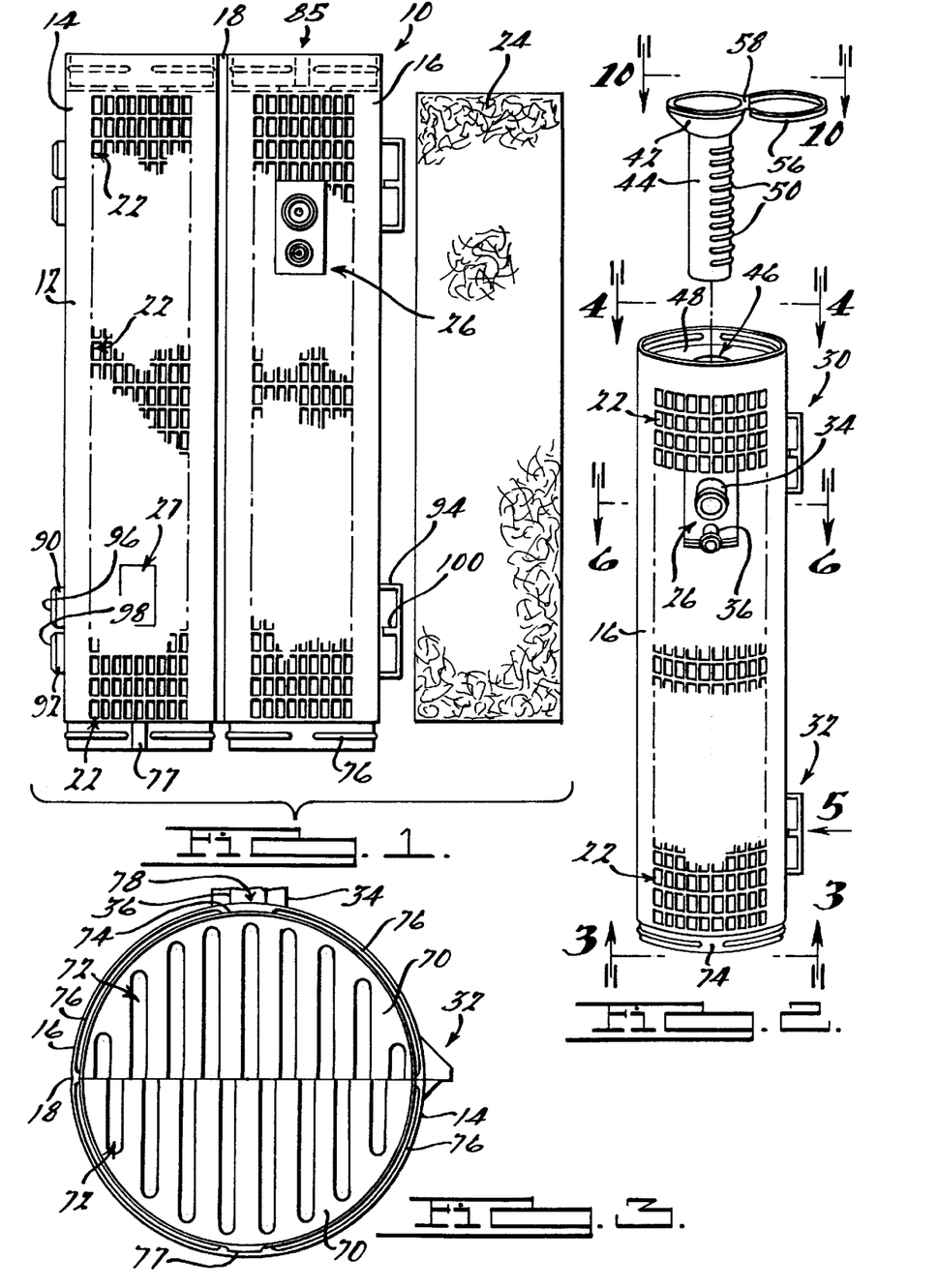
FIG. 1 is a plan view of an opened subterranean water and air collection and delivery device along with a porous insert member in accordance with the teachings of the present invention.
FIG. 2 is a view of the subterranean plant root water and air collection and delivery device in a closed position with the porous insert member located therein along with a funnel member in accordance with the teachings of the present invention.
FIG. 3 is a view, along Line 3—3 of FIG. 2, of the bottom of the subterranean plant root water and air collection and delivery device in accordance with the teachings of the present invention.

Turning to FIG. 1, an opened subterranean plant root water and air collection and delivery device 10 in accordance with the present invention is shown. The device 10 includes a plastic enclosure member 12 that may be manufactured in an open position as shown (for convenience of shipping) or closed during use in conjunction with irrigating plants. The enclosure member 12 includes a first half portion 14 and a second half portion 16 that are coupled to one another via a hinge portion 18. The enclosure member 12 has a clamshell-like shape when opened and a substantially cylindrical shape when closed. The enclosure member 12 includes a plurality of apertures 22 which are formed substantially throughout the entire surface area of the enclosure member 12. As will be discussed in detail below, when the device 10 is buried next to a plant, the apertures 22 provide ingress and egress for water, air and nutrients to and from within the enclosure member 12 and redirects these substances to the plant's root area throughout the length of the enclosure member 12. The enclosure member 12 may be formed from a rigid or a flexible material that is lightweight and resistant to corrosion from exposure to natural elements. However, the enclosure member 12 may be formed from a flexible resilient plastic material for specific applications. Therefore, it is presently preferred to manufacture the enclosure member 12 by way of an extrusion process. The extrusion process also facilitates the formation of the apertures 22 during production. Polypropolene is the preferred material for the enclosure member 12 if an extrusion process is employed. Additionally, starch may be mixed into the polypropolene to enhance biodegradability.

The device 10 includes a separate porous insert member 24 which is insertable within and substantially occupies an interior volume between the first and second half portions 14 and 16. The enclosure member 12 is designed for economy since the device is to be left in the ground indefinitely. Thus, it is typically the insert member 24 which provides structural support for the enclosure member 12. Preferably, the porous insert member 24 is made from an open cell foam or structural non-woven material that provides structural reinforcement of the enclosure member 12 and which may be replaced if necessary. In an alternate embodiment of the present invention, the porous insert member 24 is omitted. In this embodiment, the enclosure member 12 possesses sufficient rigidity due to the extrusion process of manufacturing and the size of the apertures 22 to be self-standing. As will be discussed in detail below, when the device 10 is buried in the ground, the porous insert member 24 facilitates the collection and delivery of water, air and nutrients to the root areas of a plant located in the close proximity to the device 10 while substantially preventing surrounding ground material from entering the interior volume of the enclosure member 12. The enclosure member 12 further includes an integral water coupling assembly 26 for coupling the device 10 to an underground irrigation system that supplies pressurized water and nutrients to the device 10 for rerouting to the roots of a plant. A packaging aperture 27 is formed in the first half portion 14 and is configured to receive a coupling assembly of another device stacked thereon in the opposite direction. The aperture 27 allows numerous devices to be stacked upon one another in alternating direction for purposes of mass storage and shipping.

Turning to FIG. 2, the device 10 is shown after being closed with the porous insert member 24 located within the interior volume of the enclosure member 12. In order to maintain the closed position as shown, the enclosure member 12 includes a first latch assembly 30 and a second latch assembly 32. The latch assemblies 30 and 32 are identical and will be described in detail below in conjunction with latch assembly 32.

The coupling assembly 26 includes a first nipple member 34 having a first diameter and a second nipple member 36 having a second smaller diameter. The differing diameters allow the device 10 to be coupled to irrigation systems employing water delivery members having various sizes. The specifics of the coupling assembly 26 will be described in detail below in conjunction with FIGS. 6–9.

The device 10 further includes a funnel member 40 having an upper tapered portion 42 and a lower portion 44. The lower portion 44 is configured for insertion within an aperture 46 located in a top surface 48 of the enclosure member 12. As will be discussed in conjunction with FIG. 14, the funnel member 40 provides a convenient means for manually funneling water, air and/or nutrients to the interior volume of the enclosure member 12 and ultimately to the roots of a plant when the device 10 is buried below the ground. A plurality of raised tab members 50 are formed along the lower portion 44 for engaging the top surface 48 about the edge of the aperture 46. As will be discussed in detail below in conjunction with FIG. 11, the raised tab members 50 frictionally engage the top surface 48 and enable the funnel member 40 to be extended different heights from the top surface 48 of the enclosure member 12 for different applications. A cap member 56 is coupled to the upper portion 42 by a flexible hinge 58 for capping the upper portion 42 when the funnel 40 is not in use. Preferably, the funnel member 40 is formed from a plastic material. An advantage with the use of plastic materials are their resistance to decay from exposure to the natural elements which extend the useful life of the device 10. It will be readily appreciated that the device will work with indentations in the funnel in the place of tabs 50 and tabs extending radially inwardly from the aperture 46 in the top surface 48. Further, the skilled artisan will recognize that although employment of the funnel member 40 is preferred, the device 10 may be used in its absence simply by leaving the upper portion exposed above ground.

Turning to FIG. 3, a view along Line 3—3 of a bottom surface 70 of the enclosure member 12 is shown. In order to increase the flow of water and air to and from within the device 10, a plurality of apertures 72 are formed throughout the bottom surface 70. A bottom lip member 74 is formed about the outer periphery of the bottom surface 70 for engaging and coupling the device 10 to a second identical device 10b, shown in FIGS. 12 and 13, for increasing the amount of water and air redirected to a plant. A plurality of rib members 76 are formed about an outer surface 78 of the bottom lip member 74. A key member 77 is provided for engaging a keyway of the second device 10b and for providing relative alignment of the two devices.

Figures 4, 5, 6, 7:
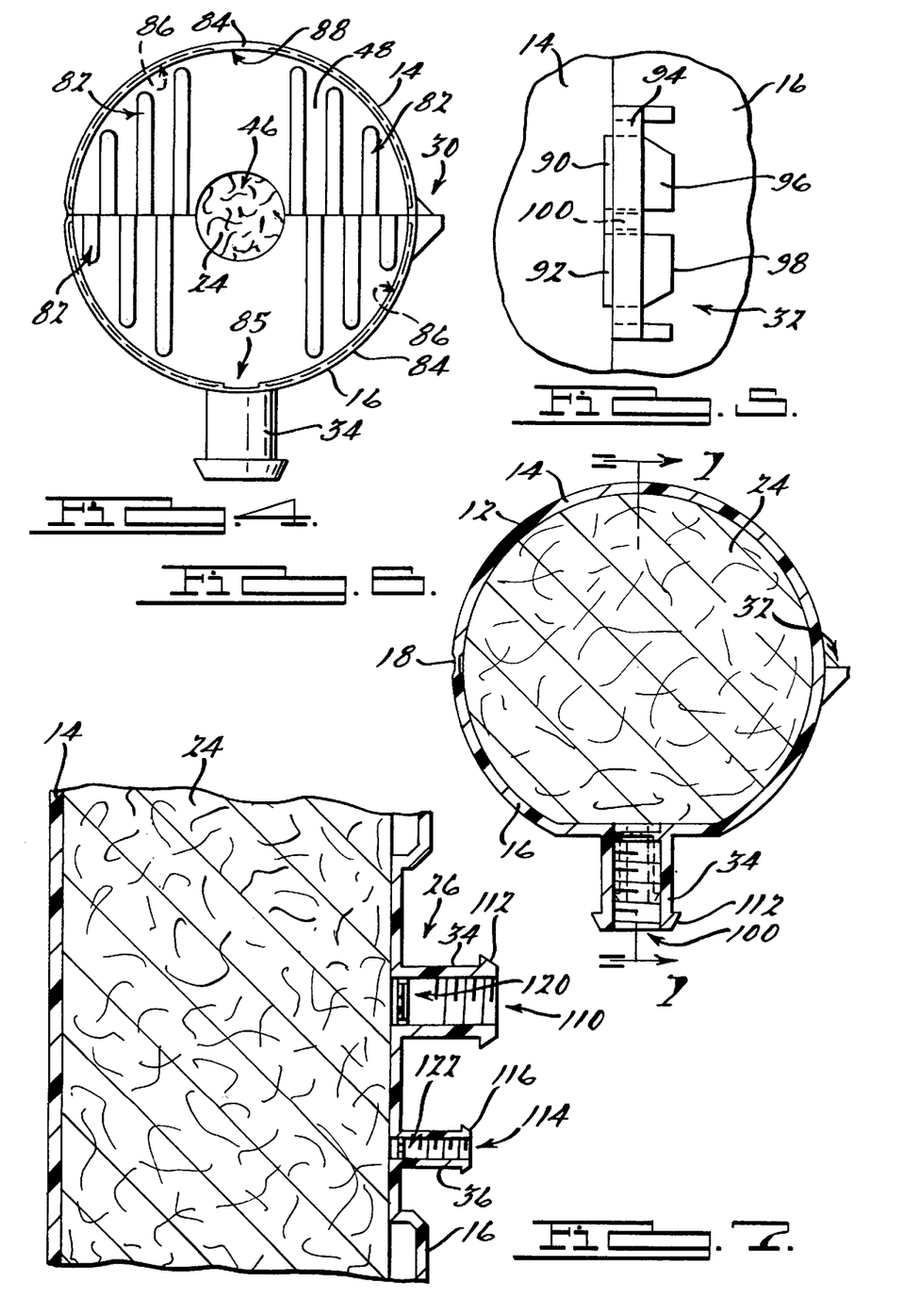
FIG. 4 is a view, along Line 4—4 of FIG. 2, of the top of the subterranean plant root water and air collection and delivery device in accordance with the teachings of the present invention.
FIG. 5 is a partial view of a closed latch assembly of the subterranean plant root water and air collection and delivery device in accordance with the present invention.
FIG. 6 is a cross-sectional view, along Line 6—6 of FIG. 2, of the subterranean plant root water and air collection and delivery device in accordance with the teachings of the present invention.
FIG. 7 is a cross-sectional view, along Line 7—7 of FIG. 6, of the subterranean plant root water and air collection and delivery device in accordance with the present invention.
Figures 24, 25, 26:
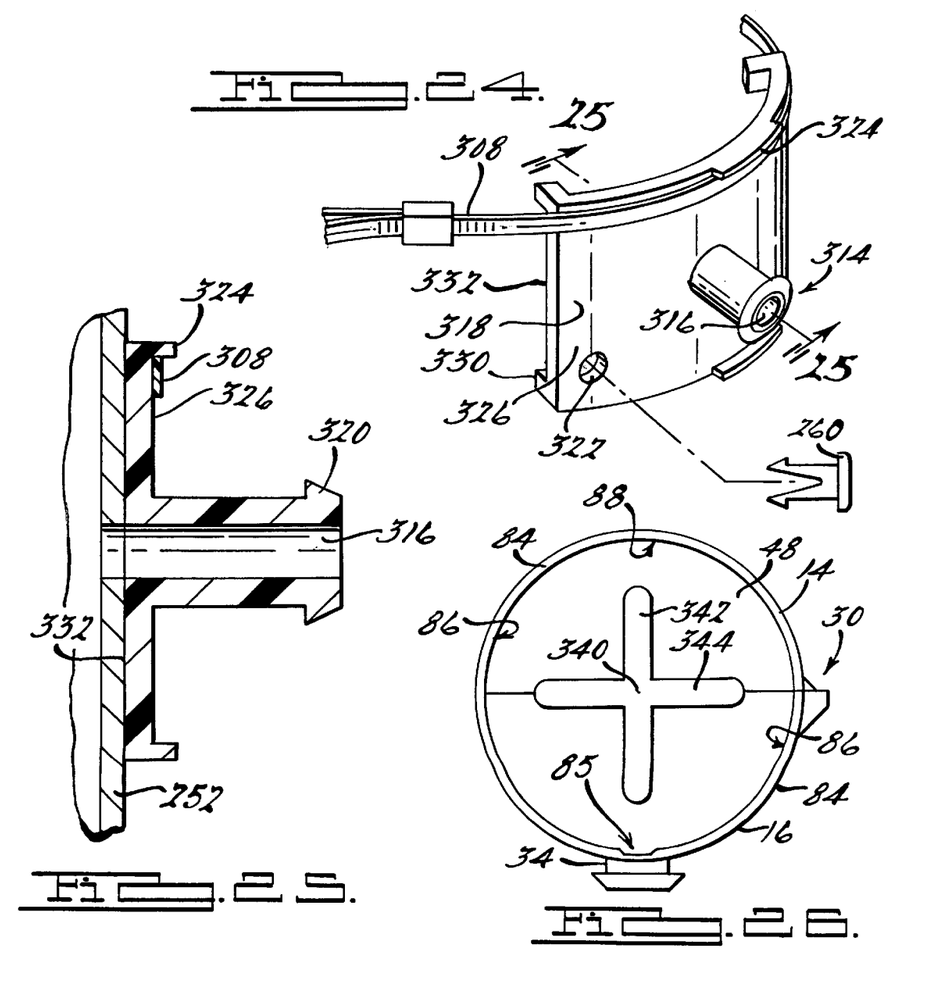
FIG. 24 is a perspective view of a nipple member made in accordance with the teachings of the present invention.
FIG. 25 is a sectional view taken along line 25—25 in FIG. 24.
FIG. 26 is a top view of an alternate embodiment top cap member.

Turning to FIG. 4, a view along Line 4—4 of FIG. 2 of the top surface 48 of the enclosure member 12 is shown. In addition to aperture 46, a plurality of apertures 82 are formed throughout the top surface 48 for increasing the flow of water and air to and from within the device 10. A top lip member 84 is formed about the outer periphery of the top surface 48. A plurality of indentations 86 and a keyway 85 are formed within an inner surface 88 of the top lip member 84. As with the bottom lip member 74, the top lip member 84 is configured for engaging a bottom lip member, configured the same as bottom lip member 74, of another subterranean plant root water and air collection and delivery device. Bottom lip rib members of another like device, configured the same as rib members 76, are secured within the indentations 86 and a keyway 85 receives a key member, configured like key member 77, for providing alignment of the device 10 and for restricting relative twisting between the devices. The top and bottom lip members 74 and 84 of the device 10 allow two other identical subterranean plant root water and air collection and delivery devices to be coupled thereto in a serial fashion for a particular application. As illustrated in FIG. 26, as an alternative to the aperture 46, an asterisk-like or cross-shaped opening 340 consisting of a plurality of intersecting slots 342, 344 may be formed in the top surface 48 for grasping an external substance delivery device such as the lower portion 44 of the funnel member 40 (FIG. 4) or the end of a hose (not shown).

Turning to FIG. 5, a partial side view, along Line 5 of FIG. 2, of the closed second latch assembly 32 is shown. As is best shown in FIG. 1, the latch assembly 32 includes first and second male latch members 90 and 92 that are formed as part of the first half portion 14 of the enclosure member 12. The latch assembly 32 further includes a female latch member 94 that is formed as part of the second half portion 16 of the enclosure member 12. The first and second male latch members 90 and 92 include lip portions 96 and 98 for engaging the female latch member 94 when the device 10 is closed. As shown FIG. 5, the first and second male latch members 90 and 92 are located within the female latch member 94 and separated by a floating center post member 100. The post member 100 allows the female latch member 94 to flex for facilitating the closure of the first and second half portions 14 and 16. As will be apparent, the first latch assembly 30 operates in an identical fashion to further assure that the first and second half portions 14 and 16 are secured to one another.

FIG. 6 is a cross-sectional view, along Line 6—6 of FIG. 2, showing the porous insert member 24 located within the interior volume of the device 10. As shown, the porous insert member 24 substantially fills the interior volume of the plastic enclosure member 12. Also from this view, the first nipple member 34 of the coupling assembly 26 is shown having a central aperture 110 which extends to the interior volume of the enclosure member 12. The nipple member 34 has a hose barb portion 112 that is configured to receive and secure a pressurized hose member (not shown) which is part of an underground irrigation system.

Turning to FIG. 7, a cross-sectional view, along Line 7—7 of FIG. 6, of both the first and second nipple members 34 and 36 is shown. Again, the first nipple member 34 is shown having a larger diameter than the second nipple member 36. The second nipple member 36 includes a central aperture 114 which extends to the interior volume of the enclosure member 12. Likewise, the second nipple member 36 includes a hose barb portion 116 for receiving and securing a pressurized hose member having smaller diameter than that used with the first nipple member 34. The nipple members 34 and 36 provide a passageway for pressurized water to enter the device 10. In order to vary the flow rate of the water entering the interior volume of the enclosure member 12, the first nipple member 34 includes a concentric punch-out assembly 120 and the second nipple member 36 includes a concentric punch-out assembly 122. The concentric punch-out assemblies 120 and 122 respectively define holes with varying diameters that restrict fluid flow and thereby adjust the flow rate of water through the nipple members 34 and 36.

Figure 8:
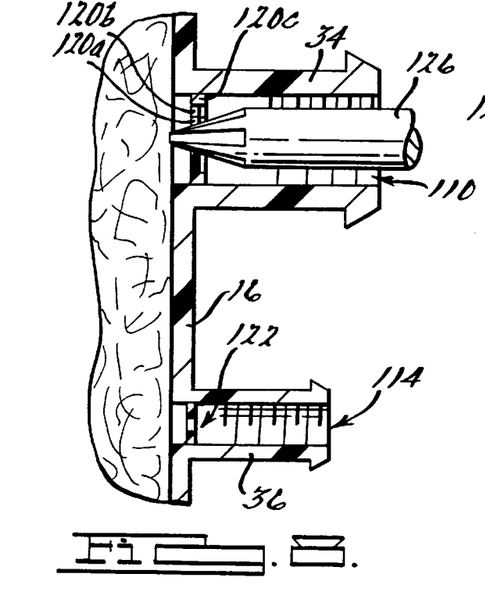
FIG. 8 is a cut-away view illustrating the use of a tool for individually removing concentric punch-out members of a coupling assembly in accordance with the teachings of the present invention.
Figure 9:
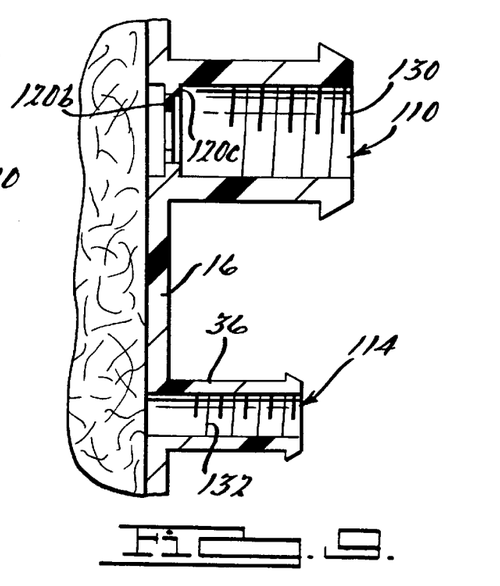
FIG. 9 is the same cut-away view as in FIG. 8 after some of the concentric punch-out members have been removed in accordance with the teachings of the present invention.

Turning to FIG. 8, a tool member 126, preferably a screw driver, is illustrated being inserted within the opening 110 of the nipple member 34. From this view, it can be seen that the concentric punch-out assembly 120 include a first member 120a, a second member 120b and a third member 120c. Each of the members 120a–120c have varying diameters and are individually removable such that the resulting diameter of the hole defined by the concentric punch-out assembly 120 may be varied. As illustrated, the tool 126 is shown engaging the first concentric punch-out member 120a so as to break it away from member 120b. As shown in FIG. 9, the removal of member 120a increases the diameter of the initial hole defined by the assembly 120 and therefore the flow rate of water into the device 10. Likewise, the tool 126 is used to adjust the diameter of the hole defined by the assembly 122. It should be noted that assemblies 120 and 122 may be modified to include more or less punch-out members for adjusting the flow rates therethrough.

As best shown in FIG. 9, the nipple member 34 includes a threaded inner surface 130, and the nipple member 36 includes a threaded inner surface 132. The threaded inner surfaces 130 and 132 are provided for engaging and securing threaded water pipe members (not shown) that are coupled to an underground irrigation system for providing pressurized water to the enclosure member 12.

Figures 10, 11:
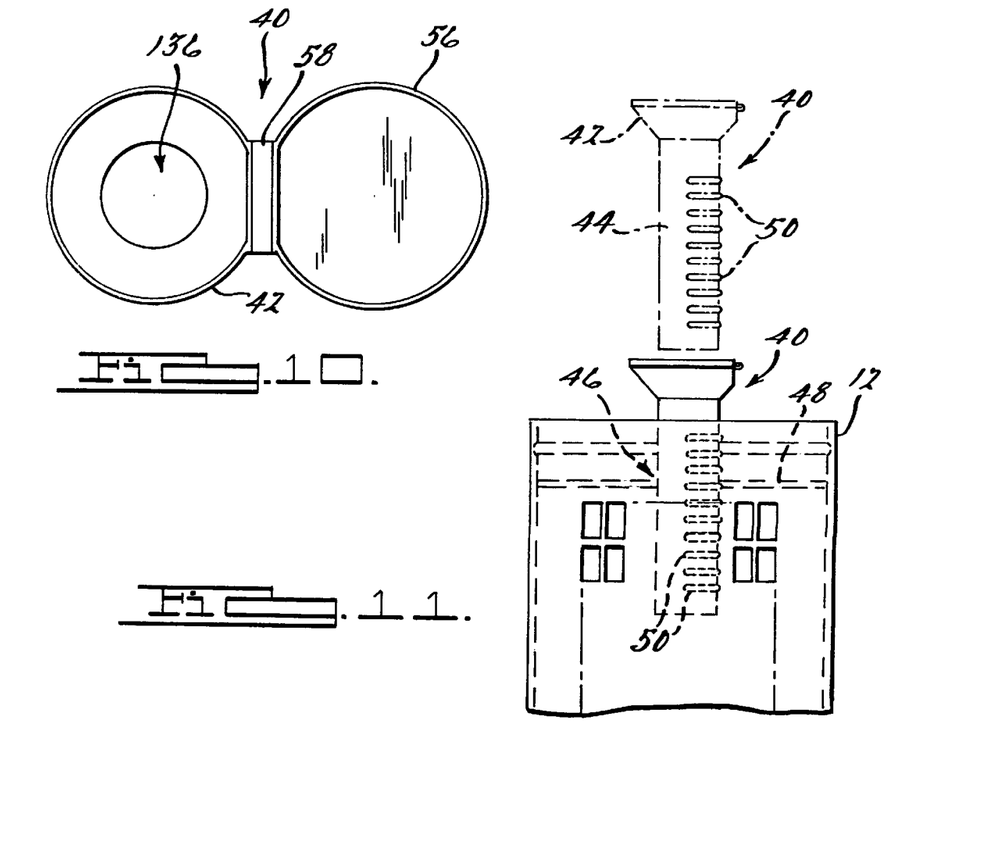
FIG. 10 is a view, along Line 10—10 of FIG. 2, of the funnel member in accordance with the teachings of the present invention.
FIG. 11 is a view illustrating the manner in which the funnel member is inserted and locked in position within the subterranean plant root water and air collection and delivery device in accordance with the teachings of the present invention.

Turning to FIG. 10, a view illustrating the funnel member 40 is shown. The funnel member 40 includes a central aperture 136 through which water, air and/or nutrients are manually funneled to the interior volume of the enclosure member 12.

Turning to FIG. 11, the funnel member 40 is shown being inserted with the aperture 46 in the top surface 48 of the enclosure member 12. As shown, the raised tabs 50 frictionally engage the top surface 48 of the enclosure member such that the upper portion 42 may be adjusted at different heights from the top surface 48. As will be apparent, the configuration of funnel member 40 may be reversed with recessed portions formed along its length frictionally engaging protrusions formed about the edge of aperture 46. As noted above, use of the funnel member 40 is optimal in that the upper portion 42 of the device 10 may be left exposed above the ground for capture of water, air and/or nutrients, through aperture 46 or in the absence of the top surface 48.

Figures 12, 13, 14:
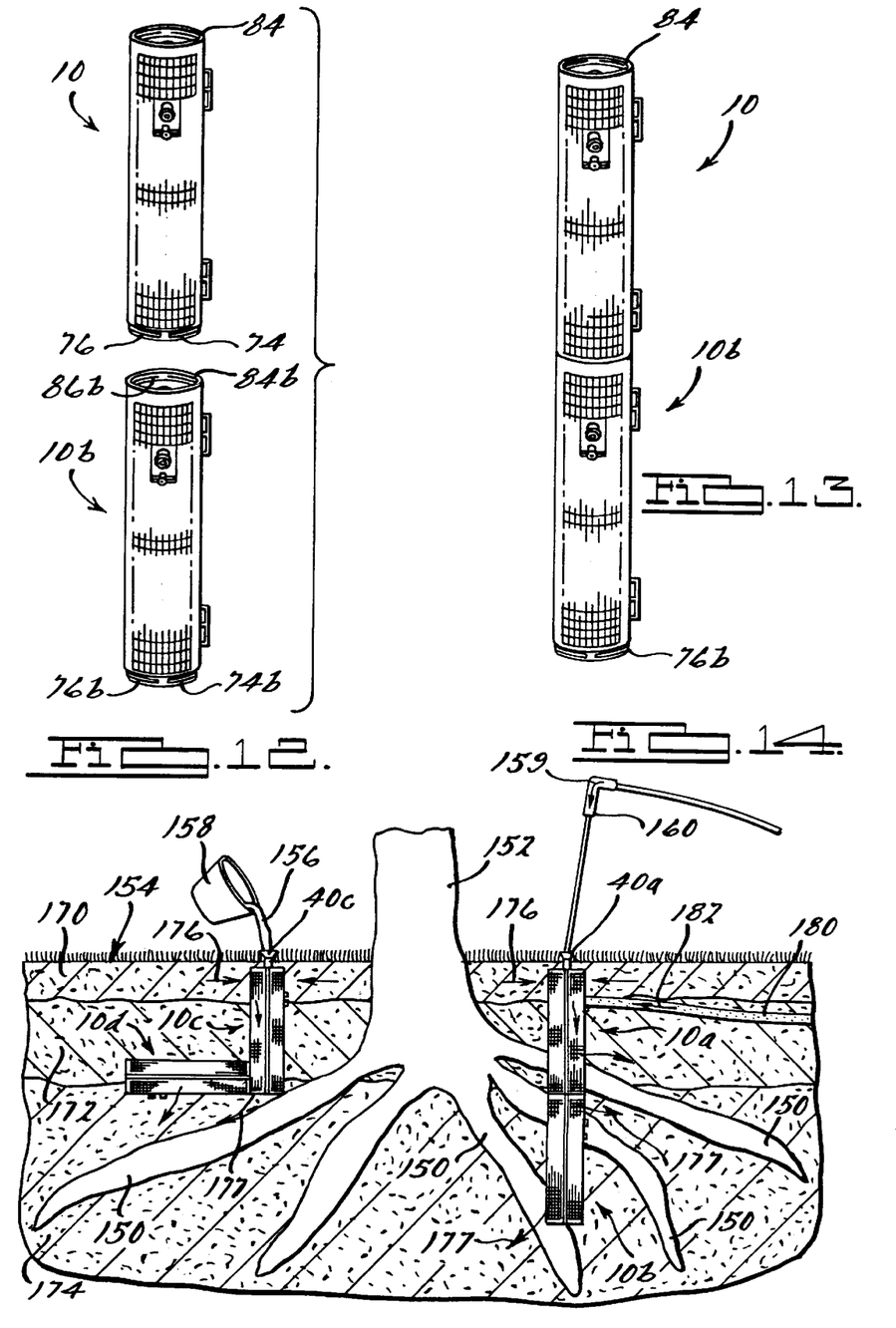
FIG. 12 is a view of two identical subterranean plant root water and air collection and delivery devices prior to being coupled to one another in accordance with the teachings of the present invention.
FIG. 13 is a view of the two subterranean water and air collection and delivery devices after being coupled to one another in accordance with the teachings of the present invention.
FIG. 14 illustrates a stand alone and a coupled pair of subterranean plant root water and air collection and delivery devices buried in substantially vertical manners in close proximity of the roots of a plant for delivering collected natural air or ground water, supplied pressurized water and nutrients to the roots at varying depths below ground level in accordance with the teachings of the present invention.

With reference to FIG. 12, the subterranean plant root water and air collection and delivery device 10 is shown prior to being coupled to the second identical subterranean plant root water and air collection and delivery device 10b. As discussed above, the bottom lip member 74 of the device 10 engages a top lip member 84b of the device 10b with the rib members 76 secured within indentations 86b of the second device 10b. Likewise, a third device (not shown) may be coupled to the top lip 84 of the device 10 or to a bottom lip member 74b of the device 10b. As shown in FIG. 13, the devices 10 and 10b are coupled to one another in a serial fashion to increase the total depth to which water and air is collected and redirected. The device may also be placed in a horizontal direction to help facilitate horizontal flow of water and air. Preferably, the devices 10 and 10b each have a length of eighteen (18) inches. However, one skilled in the art will recognize that the length of the devices 10 and 10b may be varied for a particular application.

With reference to FIG. 14, four subterranean plant root water and air collection and delivery devices 10a, 10b, 10c and 10d all having features common to device 10, are illustrated in close proximity to roots 150 and the surround areas of a tree 152. Devices 10a and 10b have been coupled to one another as illustrated in FIGS. 12 and 13 and buried in a substantially vertical manner below the ground surface 154. Likewise, the device 10c has been buried in a substantially vertical manner below the ground surface 154 in another area adjacent to the roots 150. The device 10d has been buried adjacent to device 10c in a substantially horizontal manner. Funnel members 40a and 40c have been inserted within devices 10a and 10c, as represented in FIG. 11, and extend a predetermined distance above the ground level 154. A planter simply uses an auger or similar digging tool to dig a sufficiently large hole, places the devices 10a–10d therein, and replaces a portion of the removed soil around the devices 10a–10d leaving portions of the funnel members 40a and 40c exposed. As shown, the funnel member 40c funnels water 156 which is poured from a hand-pouring device 158 to the device 10c. Similarly, the funnel member 40a is used in conjunction with a pressurized watering device 160, which delivers pressurized water and/ or nutrients 159 to the devices 10a and 10b. As shown, the devices 10a through 10c are buried such that they extend through a top soil layer 170, a clay/loam layer 172 and a clay layer 174. As discussed above, ordinary ground water illustrated as lines 176 is commonly channeled through the top soil level 170, which is well above the main portion of the roots 150. As such, this ground water 176, along with air and any supplied water, is collected and rerouted by the devices 10a through 10c, as illustrated by lines 177, to the lower ground levels 172 and 174 and ultimately the area surrounding roots 150 of the tree 152. The device 10d facilities the horizontal flow of water and air. As discussed above in conjunction with FIGS. 1–4, the apertures 22, 72 and 82 within each of the enclosures of devices 10a and 10d provide ingress and egress for the surrounding air and ground water 176 to and from within their interior volumes for redirection and delivery to the various ground levels 170, 172 and 174 where the roots 150 located. In accordance with a preferred embodiment, a pressurized water and nutrients delivering member 180 is coupled to a coupling assembly 26a, which is identical to coupling assembly 26 of device 10, for delivery of pressurized water 182 to the interior volumes of devices 10a and 10b. As with the air and surrounding ground water 176, the devices 10a and 10b reroute the pressurized water 182 throughout the various ground levels 170, 172 and 174. The devices 10a through 10d each include porous insert members 24a through 24d for facilitating the collection and delivery of the air, ground water 176, manually supplied water 156, and the pressurized water 182 while preventing any ground material from entering the interior volumes of the devices 10a through 10d.

Figure 15:
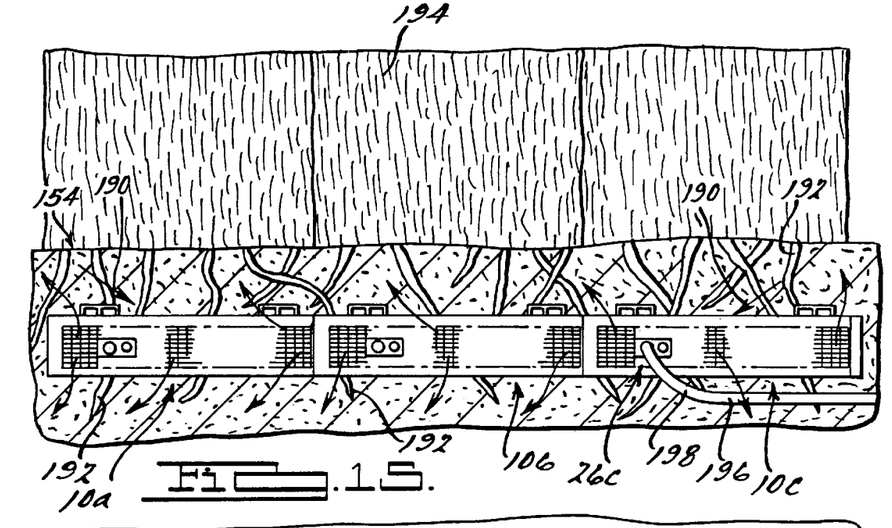
FIG. 15 illustrates three subterranean plant root water and air collection and delivery devices coupled to one another and buried in a substantially horizontal manner for delivering collected natural air or ground water, supplied pressurized water and nutrients to the roots of a plant at a substantially constant depth in accordance with the teachings of the present invention.

Next turning to FIG. 15, subterranean plant root water and air collection and delivery devices 10a, 10b and 10c are shown coupled to one another and buried in a horizontal manner for delivering surrounding air and ground water 190 at a substantially constant depth below ground level 154. The devices 10a–10c are shown buried in close proximity to roots 192 of a bush or hedge 194. Again, a pressurized water and nutrients delivery member 196 is coupled to a coupling assembly 26c for delivering pressurized water and nutrients 198 to the devices 10a–10c and the roots 192. As will be apparent from FIGS. 14 and 15, any number of subterranean plant root water collection and delivery devices may be vertically and horizontally oriented in the ground for irrigating a predetermined area throughout various depths and soil conditions.

Figure 16:
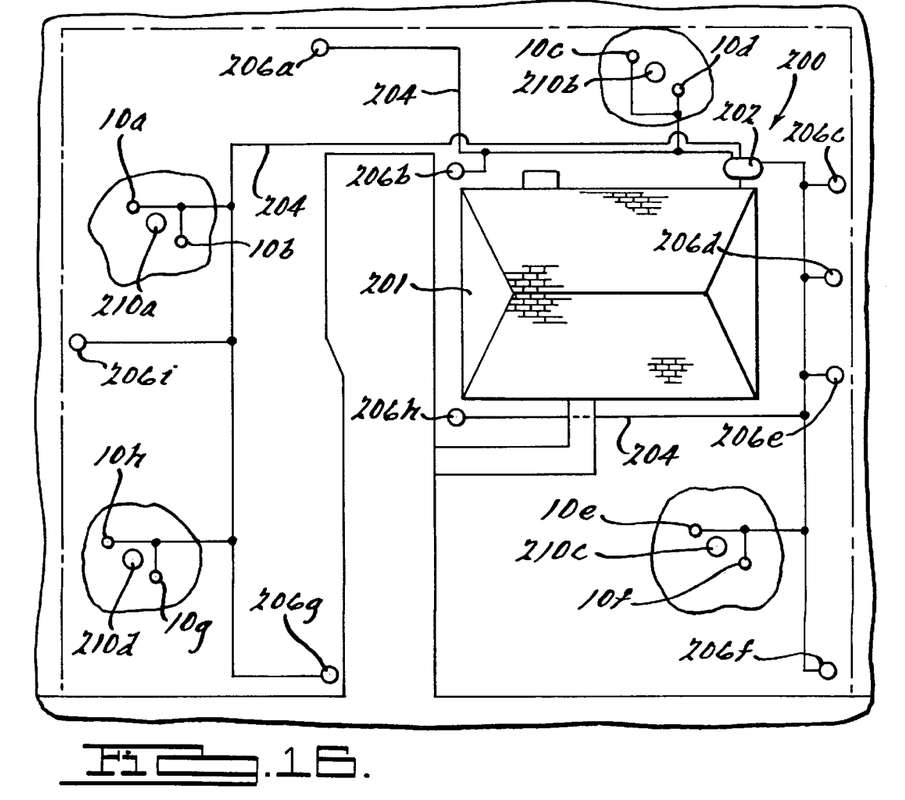
FIG. 16 is a schematic illustration of an underground irrigation system including a plurality of the subterranean plant root water and air collection and delivery devices integrated with a pressurized water supply in accordance with the teachings of the present invention.

Lastly, with reference to FIG. 16, a schematic illustration of various subterranean plant root water and air collection and delivery devices 10a through 10h, all having features common to device 10, are shown integrated within an underground irrigation system 200 associated with a building 201. The system 200 includes a pressurized water source 202 which delivers pressurized water via underground lines 204, similar to lines 180 and 196, to the devices 10a through 10h, as well as sprinkler heads 206a through 206i. The devices 10a through 10h are buried at predetermined depths in close proximity to the roots of plants 210a through 210d for efficiently collecting and delivering air, water and nutrients to the same. As will be apparent to one skilled in the art, the pressurized delivery line 204 may be in the form of hoses or threaded pipe members which are coupled to coupling assemblies 26a through 26h of the devices 10a through 10h. As discussed in conjunction with FIG. 14, the devices 10a through 10h collect and reroute naturally flowing ground water and water from the pressurized water source 202 as well as nutrients and air to the roots of the plants 210a through 210d. Likewise, devices 10a through 10h collect and redirect a portion of the water supplied by the sprinkler heads 206a through 206i to the roots of the plants 210a through 210d.

Figure 17:
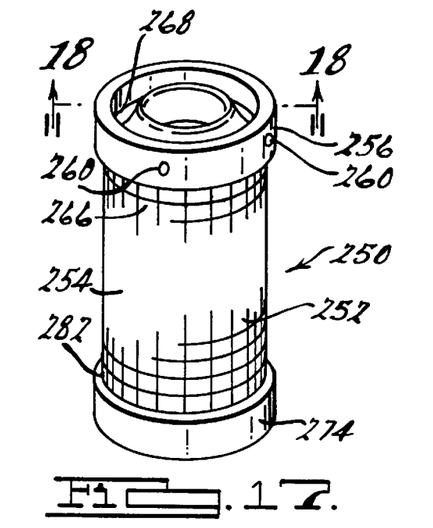
FIG. 17 is a perspective view of an alternate embodiment of the subterranean plant root water and air collection device made in accordance with the teachings of the present invention.

Referring to FIG. 17, an alternate embodiment of the subterranean plant root water and air collection and delivery device 250 is shown. The enclosure member 251 of the present embodiment preferably includes a body 252, a top cap 256, and a bottom cap 274 or other connectors as required and described herein. Generally cylindrical tube shaped body 252 is made of extruded plastic, such as polypropylene or other similar plastics, and may have additives included with the base material such that body 252 is biodegradable after a period of time while still being structurally sufficient prior to that time. The body includes a plurality of apertures 254 substantially about its entire surface. Body 252 may be provided in a wide range of precut lengths or can be provide in bulk and cut to a particular length at the site where it is being installed. The preferred embodiment of device 250 is approximately 18 inches long, as is the first embodiment.

Figure 18:
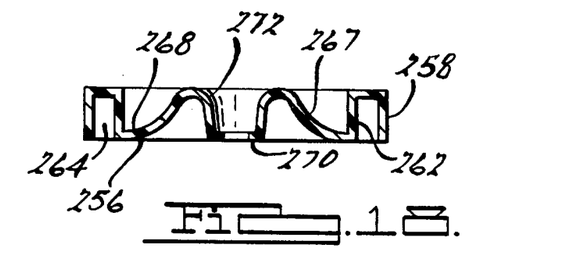
FIG. 18 is a sectional view of a top cap taken along line 18—18 in FIG. 17.

A disk shaped top cap 256, additionally shown in FIG. 18 includes an outer annular flange section 258 and is fastened to body 252 by fasteners 260 (described below). Cap 256 can be injection molded, vacuum formed, or made in any other appropriate fashion. Cap 256 has an inner flange section 262 coordinated with outer flange section 258 which forms an annular slot 264 into which a first end 266 of body 252 is inserted. An inner disk portion 267 of top cap 256 has a plurality of apertures 268 which allow for water and air flow therethrough. A funnel punch-out aperture 270 can be incorporated which accepts funnel member 40, previously described in connection with the first embodiment. Structural contours, generally at 272, may be incorporated into inner disk portion 267 to provide additional strength to top cap 256, and to rigidly support funnel member 40.

Figure 19:
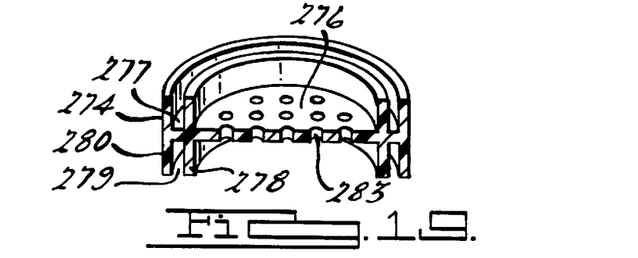
FIG. 19 is a sectional view of an alternate bottom cap made in accordance with the teachings of the present invention.

A top cap 256 where the funnel punch-out 270 has not been removed (not shown) can be used as a bottom cap if desired. Alternately, a unique bottom cap 274 can be utilized, as shown in FIGS. 17 and 19. Bottom cap 274 includes an inner disk shaped portion 276 and a pair of generally parallel flanges 278 and 280 near the radially outer edge of disk portion 276. Flanges 278 and 280 form annular slots 277 and 279. Flanges 278 and 280 are generally perpendicular to inner disk 276 and extend on each side of the inner disk 276 as shown. This allows a second body 252a (not shown) to be attached to a second end 282 of the first body 252 by inserting second end 282 into slot 277 and inserting a first end 266a (not shown) of body 252a into slot 279. Inner disk 276 has a plurality of apertures 283 so that water and air may flow from first body 252 to second body 252a or to the soil below. Inner disk 276 can also be constructed without any apertures (not shown) if there is a desire to prevent water and air flow to the ground below when the bottom cap 274 is used to cap a body which is not connected to a second or subsequent body.

Fasteners 260 used to secure the top and/or bottom cap, 256 and 274 respectively, to body 252 can be selected from a wide range of fastening devices. Particularly, staples, rivets, screws, plastic one-way push pins (often referred to as christmas trees), plastic reusable push pins, and metal spring clips are all considered appropriate, as well as other similar retention devices.

The porous insert member 24 is insertable within and substantially occupies the interior volume of body 252. Preferably insert member 24 is made from an open cell foam or structural non-woven material which provides some structural reinforcement for the body and which can be replaceable if necessary or desirable.

Figure 20:
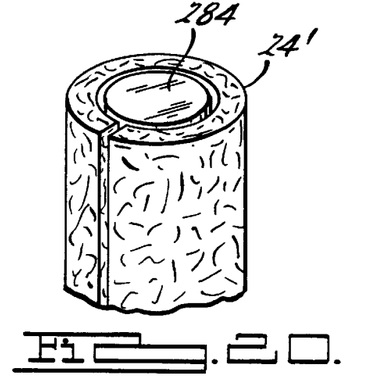
FIG. 20 is a perspective view of an alternate insert member made in accordance with the teachings of the present invention.

Referring to FIG. 20, there is shown a sheet type porous insert member 24'. A slow dissolving fertilizer spike 284, which will provide additional nutrients to the surrounding soil and therefore the roots in the vicinity, can be wrapped within the sheet type porous insert member 24' prior to insertion into body 252. Alternately, the insert member 24 itself can be coated with a solution of slow dissolving fertilizer. When the spike 284 or the fertilizer coating is determined to be dissolved, the insert member 24 or 24' can be removed and replaced with a fresh insert containing a fertilizer spike or having a fertilizer coating.

Figure 21:
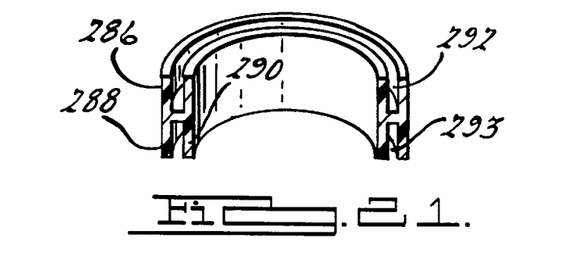
FIG. 21 is a sectional view of a through connector made in accordance with the teachings of the present invention.

As in the first embodiment, the bodies of the present embodiment can be stacked or connected in a wide variety of arrangements. Bottom cap 274 is one means of connecting two sequential bodies. Another connector is shown in FIG. 21 and is referred to as through connector 286. Through connector 286 is utilized when it is desirable to provide access to the interior volume of a subsequent body. This may be particularly useful if a fertilizer spike or fertilizer coated insert member is positioned down some distance below the surface of the ground in order to be located closer to the roots of a deep rooted plant. As shown, through connector 286 is constructed similar to that of the bottom cap 274, having a pair of annular flanges 288 and 290 providing annular slots 292 and 293 which accept the second end 282 of body 252 and the first end 266a of second body 252a. The primary difference being that through connector 286 does not contain a center disk portion like bottom cap 274.

Figure 22:
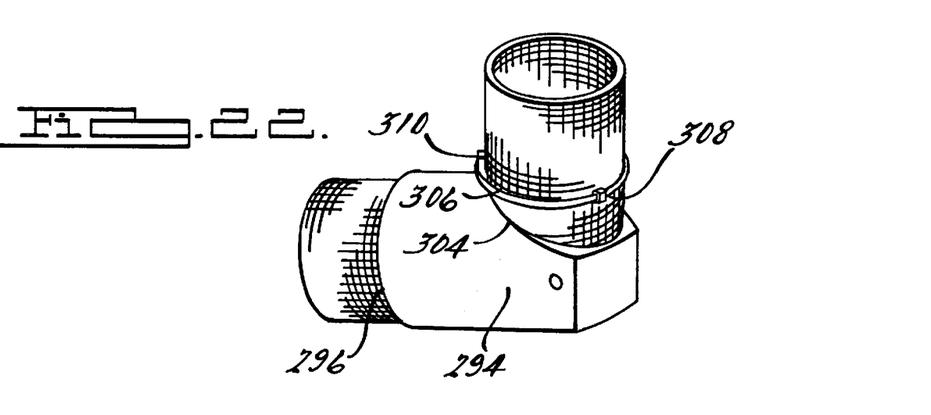
FIG. 22 is an angle connector utilized in the present invention.
Figure 23:
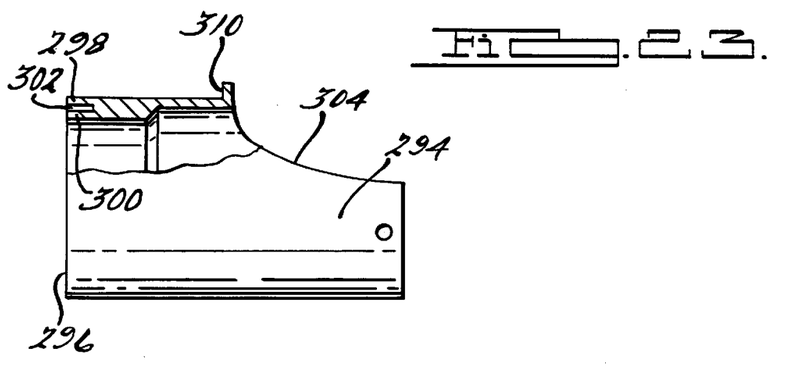
FIG. 23 is a partial sectional view of the angle connector from FIG. 22.

Another connector which can be used in conjunction with the present embodiment is an angle connector 294 as shown in FIG.'S 22 and 23. Angle connector 294 will typically but is not limited to being used where a vertical body is being connected to a horizontal body, as shown in FIG. 14 elements 10c and 10d for the prior embodiment. Angle connector 294 includes a first end 296 having a pair of annular flanges 298 and 300 which provide an annular slot 302 into which a first end 266a of second body 252a can be inserted. The outer flange 298 extends as shown to provide a contoured mating surface 304 which coordinates with the cylindrical side surface 306 of first body 252. Depending upon the angle, contoured mating surface 304 will change slightly to match with cylindrical side surface 306 of first body 252 at that particular angle. A 90 degree angle connector is shown for purposes of illustration since it is believed to be the connector of this type which would predominantly be used. However, other angles, such as 30 degrees or 45 degrees, may be common when positioning a sequence of bodies horizontally along a hedge or row of bushes which themselves have an angle portion. The angle connectors can be held in place by fasteners 260 as previously discussed, or may be retained by wraps 308 (such as plastic wire ties or the like) which surround first body 252 and attach to upstanding flanges 310 on angle connector 294.

The present embodiment also provides for connection to a pressurized water supply system or other pipes or hoses, by attaching a variety of nipples. A push-on type nipple member 314, similar to that of 34 or 36, is shown in FIG.'S 24 and 25. As shown, nipple member 314 has a central aperture 316 which extends through a curved base portion 318. A hose barb portion 320 is configured to receive and secure a pressurized hose (not shown) which is a part of an irrigation system. Curved base portion 318 provides apertures 322 for connecting nipple member 314 to body 252 using fasteners 260 similar to those used to attach top cap 256 and bottom cap 274 to body 252. Curved portion 318 also provides retention tabs 324, projecting from a first surface 326 which can be used in conjunction with wraps 308 (such as plastic wire ties or the like) which are wrapped around body 252 and secure nipple member 314 in place. Positioning tabs 330 can also be incorporated from a second side 332 of curved portion 318. Positioning tabs 330 are sized and spaced such that they will extend through apertures 254 in body 252 and help prevent rotation or movement of nipple member 314.

Threaded nipples, having either interior or exterior threads, or both, can be used in place of push-on type nipple member 314. The retention members and structure would be similar to that of nipple member 314 and are readily interchangeable with the push-on nipple member 314.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A subterranean plant root water and air collection and delivery device, comprising:

an enclosure member including a body having a first end and a second end, a top cap fastened to the first end of the body, and a bottom cap fastened to the second end of the body, said body including a plurality of apertures and having an interior volume within which surrounding ground water and air is collected; and a porous insert member insertable within the interior volume of the enclosure member and substantially occupying the entire interior volume for facilitating collection and delivery of the ground water and air to a root area of at least one plant while substantially preventing surrounding ground material from entering the interior volume of the enclosure member, whereby the enclosure member is buried at a predetermined depth in close proximity to the root area of the at least one plant such that the plurality of apertures provide ingress for the surrounding air and ground water to the interior volume along a length of the enclosure member and whereby the plurality of apertures provide egress along the length for delivering the water and air to an area adjacent the root area.

2. The plant root water and air collection and delivery device of claim 1 wherein the enclosure member further comprises:

a connector fastened to the second end of the body, the connector providing for attachment of a second body.

3. The plant root water and air collection and delivery device of claim 2 wherein the connector is substantially impermeable to water.

4. The plant root water and air collection and delivery device of claim 2 wherein said connector includes a plurality of apertures therein for the transgression of water and air therethrough.

5. The plant root water and air collection and delivery device of claim 2 wherein the connector includes a central through hole formed therein for passage of the porous insert member.

6. The plant root water and air collection and delivery device of claim 2 wherein the connector includes an outer flange and an inner flange defining a slot therebetween for engaging said second body.

7. The plant root water and air collection and delivery device of claim 2 wherein the connector is angled to a pre-selected degree.

8. The plant root water and air collection and delivery device of claim 1 wherein the top cap includes a punch out apparatus for selectively coupling with a funnel member for funneling external substances to the internal volume of the body.

9. The plant root water and air collection and delivery device of claim 1 wherein the top cap includes structural contours for providing added structural rigidity to the top cap.

10. The plant root water and air collection and delivery device of claim 1 wherein the top cap includes an outer flange and an inner flange defining a slot therebetween for engaging the body.

11. The plant root water and air collection and delivery device of claim 1 wherein the top cap includes a plurality of apertures for delivering water and air therethrough.

12. The plant root water and air collection and delivery device of claim 1 wherein the top cap includes a central throughhole for passage of the porous insert member therethrough.

13. The plant root water and air collection and delivery device of claim 1 wherein the bottom cap includes an outer flange and an inner flange defining a slot therebetween for engaging the body.

14. The plant root water and air collection and delivery device of claim 1 wherein the bottom cap includes a plurality of apertures therein for delivering water and air therethrough.

15. The plant root water and air collection and delivery device of claim 1 wherein the bottom cap includes a central throughhole formed therein for passage of the porous insert member therethrough.

16. The plant root water and air collection and delivery device of claim 1 wherein the porous insert member includes a wrapped sheet configuration.

17. The plant root water and air collection and delivery device of claim 1 wherein the porous insert member includes a fertilizer member therein for providing nutrients to the root area of the at least one plant.

18. The plant root water and air collection and delivery device of claim 17 wherein the fertilizer member includes a coating deposited on the porous insert member.

19. The plant root water and air collection and delivery device of claim 17 wherein the fertilizer member includes a discrete device wrapped within the porous insert member.

20. The plant root water and air collection and delivery device of claim 1, further comprising:

coupling means for coupling a pressurized water delivery member to the enclosure member such that water is delivered to the interior volume and ultimately to the roots of the at least one plant.

21. The plant root water and air delivery device of claim 1, wherein the top cap includes a plurality of intersecting slots defining an opening therethrough for insertion of an external substance delivery device.

22. A subterranean plant root water and air collection and delivery device, comprising:

an extruded enclosure member including a body having a first end and a second end, a top cap fastened to the first end of the body, and a bottom cap fastened to the second end of the body, said body including a plurality of apertures, the body having an interior volume, the interior volume and the apertures providing a path within which surrounding ground water and air is collected and delivered to a root area of at least one plant, the apertures of the body being of a size to substantially prevent surrounding ground material from entering the interior volume of the enclosure member, whereby the enclosure member is buried at a predetermined depth in close proximity to the root area of the at least one plant such that the plurality of apertures provided ingress for the surrounding air and ground water to the interior volume along a length of the enclosure member and whereby the plurality of apertures provides egress along the lengthy for delivering the water and air to an area adjacent to root area.

* * * * *